Patented Aug. 30, 1927.

1,640,363

UNITED STATES PATENT OFFICE.

JOHN McGAVACK, OF ELMHURST, NEW YORK, ASSIGNOR TO THE REVERE RUBBER COMPANY, OF CHELSEA, MASSACHUSETTS, A CORPORATION OF RHODE ISLAND.

PROCESS FOR PREPARING RUBBER-CONTAINING PLASTICS AND PRODUCTS OBTAINED THEREBY.

No Drawing.   Application filed July 3, 1923.   Serial No. 649,376.

This invention relates to processes for preparing rubber-containing plastics, being more particularly directed to a process for producing such a plastic containing an aldehyde or an aldehyde and a phenol; and to the products obtained thereby.

The principal object of the invention is to provide a simple, efficient process for producing plastics of the kind described and to provide a series of useful products having properties like those of both hard rubber and bakelite.

The invention accordingly comprises a process for making rubber combinations which includes causing a reaction to occur between rubber, preferably in the form of a solution, an aldehyde, and a phenol if desired, and a condensing agent, and recovering the reaction product formed; and the reaction products so formed.

The term "solution" as herein employed is intended to include rubber dissolved in an organic solvent such as carbon tetrachloride, chloroform, benzol, etc., as well as rubber latex or other water emulsion of rubber with or without admixture of an organic solvent such as carbon tetrachloride, etc.

Example 1.

The following procedure represents one embodiment of the invention: 15 kg. of pale crepe are dissolved in 300 kg. of carbon tetrachloride. 25 kg. of concentrated sulphuric acid (specific gravity 1.84), which acts as a condensing agent, are added to this mass and intimately mixed. To the mixture is added 40 kg. of a 40% solution of formaldehyde. The materials so mixed are placed in a vessel under reflux condenser and heated at 100° C. for from 2 to 3 hrs. The resulting mass is a grayish white product. It contains free acid, formaldehyde and carbon tetrachloride. 100 kg. of water are now added to the mass and carbon tetrachloride is removed by distillation. Approximately 90% of the carbon tetrachloride may be recovered in this way. The mass is then washed in running water to free it completely from free acid. The product is then dried in any convenient manner. It is first milled on the cold mill. The milled mass is subsequently heated at approximately 95° C. until dry. The product is a brownish black powder which is molded at 140-160° C. The material will take a high polish, and may be machined, turned, sawed or drilled.

The material so obtained molded under 3000 to 4000 lbs. per square inch has a specific gravity of approximately 1.05 at approximately 18° C. It has a softening point of 130° C. It has a transverse tensile strength of approximately 400 lbs. per square inch and is practically insoluble in all acids and bases as well as organic solvents. It is opaque, and is useful as an electric insulating material. It has a brittleness approximating that of hard rubber.

It has been definitely proved that the brownish black powder is a definite chemical compound and not a mixture of the various components involved. This has been proved by varying the proportions of the ingredients employed in forming the substance within a sufficient range to show an appreciable variation in the carbon, hydrogen, oxygen and sulphur content of the mass in case simply a mixture were present. The analysis in all cases of the resulting product has been as follows:—carbon approximately 64.8, hydrogen 8.8, oxygen 22, sulphur 1.5.

Instead of carrying out the procedure in a reflux condenser the mixture of dissolved rubber, sulphuric acid and formaldehyde may be placed in a pressure bomb and heated to 140° C. for 30 to 60 minutes, at the end of which time the brownish black powder obtained as above is secured.

Example 2.

Instead of formaldehyde as mentioned in the above example there may be substituted 15 kg. of butyl aldehyde or 15 kg. of furfural. The mixture including butyl aldehyde or furfural is placed in a container and heated to 100° C. for 2 to 3 hrs. The material is washed and dried as indicated in the above example and in each instance where butyl aldehyde or furfural is employed produces a product having similar properties to that produced in accordance with Example 1, except that the materials according to the present example have slightly lower softening points than those prepare from formaldehyde.

*Example 3.*

As another example of the procedure 15 kg. of rubber are dissolved in 300 kg. of carbon tetrachloride to which is added 25 kg. of sulphuric acid, 40 kg. of a 40% solution of formaldehyde in which is dissolved 15 kg. of phenol (carbolic acid) is added to this mixture. The whole mixture is then placed in a vessel provided with a reflux condenser and heated at approximately 100° C. for 2 to 3 hrs. The resulting product is then washed in 100 kg. of water, milled and dried as above. The resulting material is reddish brown. It is molded under 3000 to 4000 lbs. per square inch pressure at 150–170° C. Its general physical properties resemble those of the materials produced in Example 1 above. The material appears to be made up of a homogeneous mixture of the material made in accordance with Example 1 and a condensation product of phenol and formaldehyde.

*Example 4.*

As another example of the process 15 kg. of rubber are dissolved in 300 kg. of carbon tetrachloride and to this is added 15 kg. of butyl aldehyde and 15 kg. of phenol. 10 kg. of concentrated sulphuric acid are now added and the mass is refluxed and heated for 2 to 3 hrs. at 100° C. The black viscous liquid obtained is treated with 100 kg. of water as above and distilled to remove the carbon tetrachloride and excess butyl aldehyde. The mass is then washed, milled and dried as indicated in Example 1 to form a black resinous material which resembles the products produced by the processes in Example 3 above but is somewhat more brittle.

*Example 5.*

As another example of the process, to 100 kg. of latex is added 650 kg. of carbon tetrachloride and the mixture is shaken until a smooth emulsion is formed. To this is added 30 kg. of phenol and 80 kg. of a 40% formaldehyde solution. These constituents are thoroughly mixed and 40 kg. of concentrated sulphuric acid are then introduced. These constituents are placed in a vessel provided with a reflux condenser and heated to 100° C. for from 2 to 3 hrs. The resultant product is washed and dried as indicated in the example above, and may then be molded into a plastic mass. The material has approximately the properties described in Example 3 above.

Although carbon tetrachloride has been indicated as a solvent for rubber, it will be understood that various other solvents may be used such as chloroform, benzol, solvent naphtha and similar materials.

Furthermore other aldehydes than formaldehydes, butyl aldehyde and furfural may be employed. Acetaldehyde, benzaldehyde and aldehyde ammonia have been employed with equally good results. Instead of phenol, cresol or a homologue may be employed or a mixture of phenol may be used if desired with a mixture of aldehyde or with a single aldehyde.

The materials produced in accordance with the above procedures find application for the production of battery jars, knife handles, pipe stems, electric insulation, and in general may be employed for similar purposes to those for which bakelite and hard rubber are used. The processes mentioned above are inexpensive, simple and employ inexpensive raw materials. As compared with bakelite the material is practically free from the odor of phenol. In the molding process in the case of bakelite it is necessary to heat to a relatively high temperature and then cool to a relatively low temperature before opening the mold in order to avoid "blowing". In the present invention it is possible to mold at a low temperature and relatively little care need be taken in molding before opening of the mold.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process for making rubber combinations which comprises causing a reaction to occur between rubber, aldehyde and a condensing agent, and recovering the reaction product formed.

2. A process for making rubber combinations which comprises causing a reaction to occur between rubber, aldehyde and an acid condensing agent, and recovering the reaction product formed.

3. A process for making rubber combinations which comprises causing a reaction to occur between a solution of rubber, aldehyde and a mineral acid, and recovering the reaction product formed.

4. A process for making rubber combinations which comprises causing a reaction to occur between a solution of rubber, formaldehyde and a condensing agent, and recovering the reaction product formed.

5. A process for making rubber combinations which comprises treating a solution of rubber with formaldehyde and sulphuric acid under heat until a reaction occurs therebetween, and recovering the reaction product formed.

6. A process for making rubber combinations which comprises heating rubber, an organic solvent, a formaldehyde, sulphuric acid to aproximately 100° C. for 2 to 3 hrs., drying and molding the reaction product obtained.

7. As a new compound a product of the reaction of rubber and an aldehyde in the presence of sulphuric acid.

8. As a new compound a product of the reaction of rubber and formaldehyde in the presence of a condensing agent.

9. As a new compound a blackish brown powder comprising rubber in combination with an aldehyde, having a softening point of approximately 130° C., a brittleness similar to hard rubber, generally insoluble in acids, bases and organic solvents.

Signed at New York, New York, this 27th day of June, 1923.

JOHN McGAVACK.